May 25, 1926.

A. S. BACON ET AL 1,586,500

CYLINDER BORING TOOL

Filed April 20, 1921

INVENTORS
GEORGE W. HUGHSON
ARTHUR S. BACON
BY
Chas. E. Townsend
ATTORNEY

May 25, 1926.

A. S. BACON ET AL 1,586,500

CYLINDER BORING TOOL

Filed April 20, 1921   4 Sheets-Sheet 3

INVENTORS
GEORGE W. HUGHSON
ARTHUR S. BACON

Chas. E. Townsend

ATTORNEY

May 25, 1926.

A. S. BACON ET AL 1,586,500

CYLINDER BORING TOOL

Filed April 20, 1921     4 Sheets-Sheet 4

INVENTORS
GEORGE W. HUGHSON
ARTHUR S. BACON
BY
Chas. E. Townsend
ATTORNEY

Patented May 25, 1926.

1,586,500

UNITED STATES PATENT OFFICE.

ARTHUR S. BACON AND GEORGE W. HUGHSON, OF OAKLAND, CALIFORNIA.

CYLINDER-BORING TOOL.

Application filed April 20, 1921. Serial No. 462,922.

This invention relates to a cylinder boring tool, and especially to a tool of the portable type which is adapted to be centered and secured directly to the cylinder or other object to be bored.

One of the objects of the present invention is to generally improve and simplify a tool of the character described; to provide a tool which is substantial and compact in construction; fairly light in weight, and which may be quickly attached or removed with relation to a cylinder to be bored.

Another object of the invention is to provide means for centering the tool with relation to the cylinder bore, said means permitting removal of the tool and re-centering of the same if desired.

Another object of the invention is to provide an improved form of automatic feed mechanism whereby the advance of the cutting tool is actuated; further to provide an automatic feed mechanism which may be varied to increase or decrease the rate of advance, and also to provide means whereby said automatic feed mechanism may be reversed.

Another object of the invention is to so construct the feed mechanism that if the boring bar or tool comes in contact with a solid obstruction, the feed mechanism will be rendered inoperative, thereby preventing breakage of the tool, the cylinder or the actuating mechanism.

Another object of the invention is to provide means for automatically stopping longitudinal movement of the cutting bar in either direction when predetermined extreme limits have been reached.

Another object of the invention is to provide a flexible drive for rotating and advancing the cutting bar, and particularly a flexible drive which will avoid the transmission of all load shocks and vibrations.

Further objects will hereinafter appear.

The invention consists of the parts and the construction, combination and arrangement of parts as hereinafter more fully described and claimed, having reference to the accompanying drawings, in which—

Figure 5:
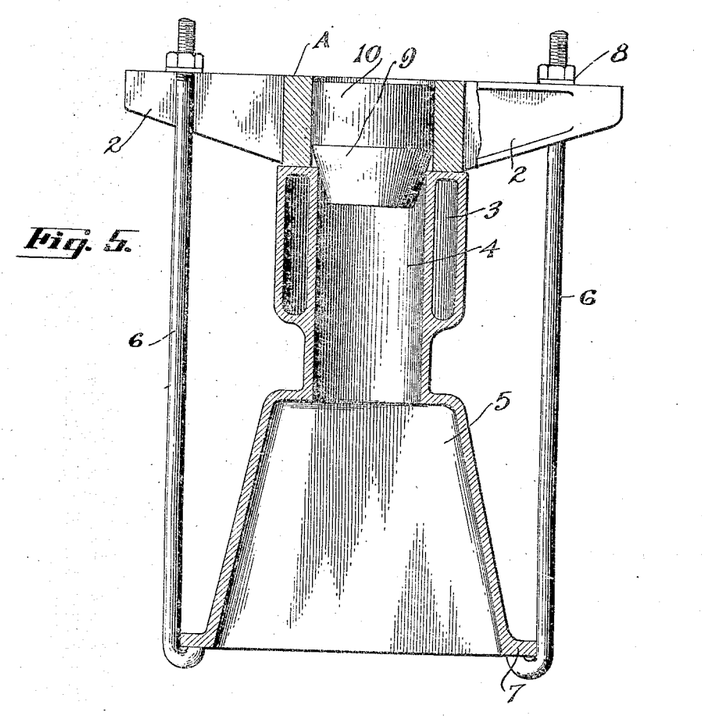
Fig. 5 is a central, vertical section of a cylinder showing the method of centering the base member with relation to the cylinder, and also the means for securing the base member with relation to the cylinder.

Referring to the drawings in detail, and particularly to Fig. 5, A indicates a base member consisting of a cylindrical ring, from opposite sides of which extend radially disposed arms 2. 3 indicates a cylinder of suitable construction, 4 the bore extending therethrough, and 5 the upper part of the crank case. The base member may be secured to the upper end of the cylinder in any suitable manner, but preferably as here shown by means of a pair of rods 6, the lower ends of which are hook-shaped to engage the flange of the crank case as indicated at 7. The upper ends of the rods extend through the slotted arms 2, and they are threaded to receive washers and nuts 8, whereby the base member may be tightly clamped against the end of the cylinder.

One of the important features of the present invention is the provision of means for centering the base member with relation to the cylinder. The means employed in the present instance is a cone-shaped member 9. The upper end of this member is cylindrical as indicated at 10 and snugly fits the interior bore of the base ring A. By placing the base on top of the cylinder and then inserting the member indicated by the numerals 9 and 10, it can be seen that the cone-shaped end will automatically center itself with relation to the cylinder bore 4, and similarly the base ring A. With the center located, it will only be necessary to tighten the nuts 8 and thereby securely clamp the base member in position. This method of centering the base member or insuring a concentric positioning thereof with relation to the bore of the cylinder is quickly accomplished by the centering cone or member shown, and even permits removal and replacement of the base member at any time if conditions should arise which would require temporary removal of the base. The size of the base member and the centering cone may of course be varied to suit cylinders of varying diameters.

Figure 1:
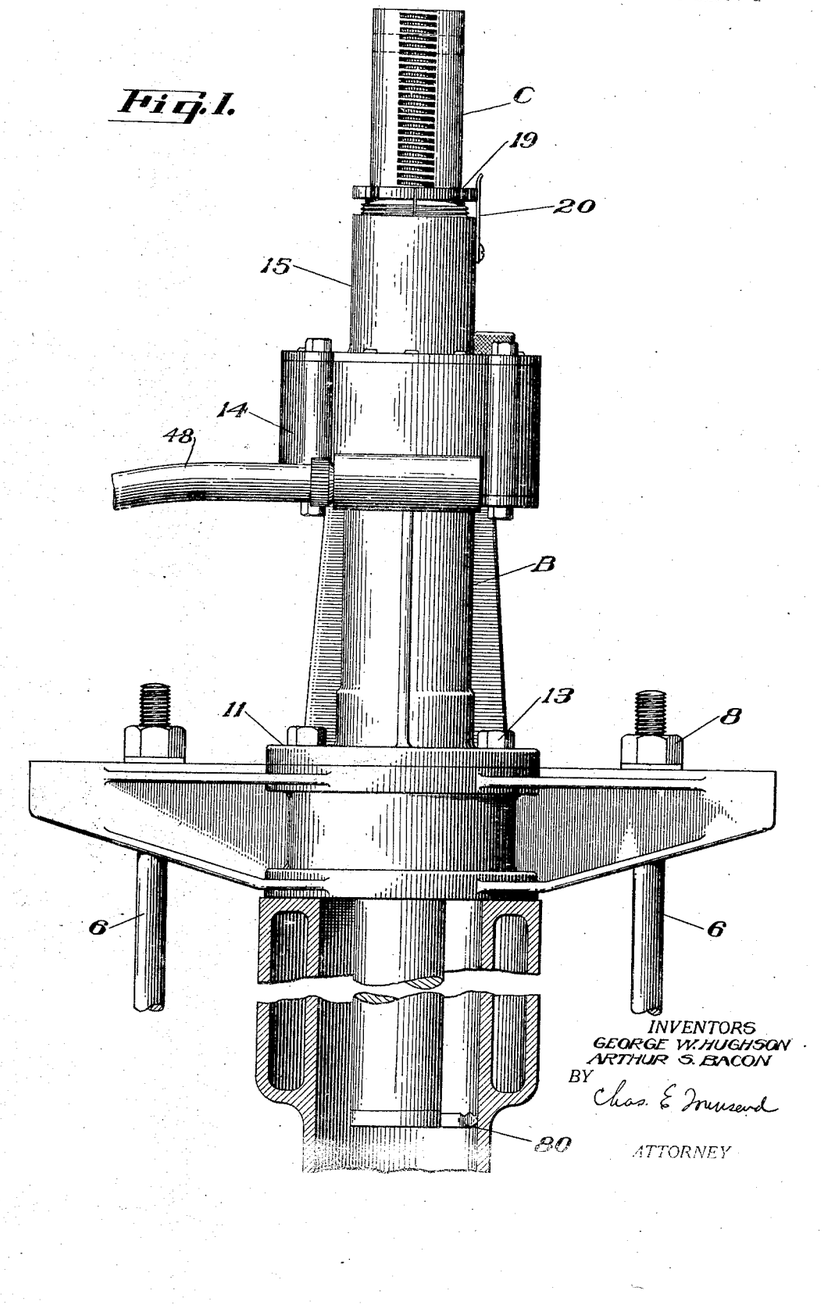
Fig. 1 is a side elevation of the boring tool showing it in position on a cylinder.
Figure 2:
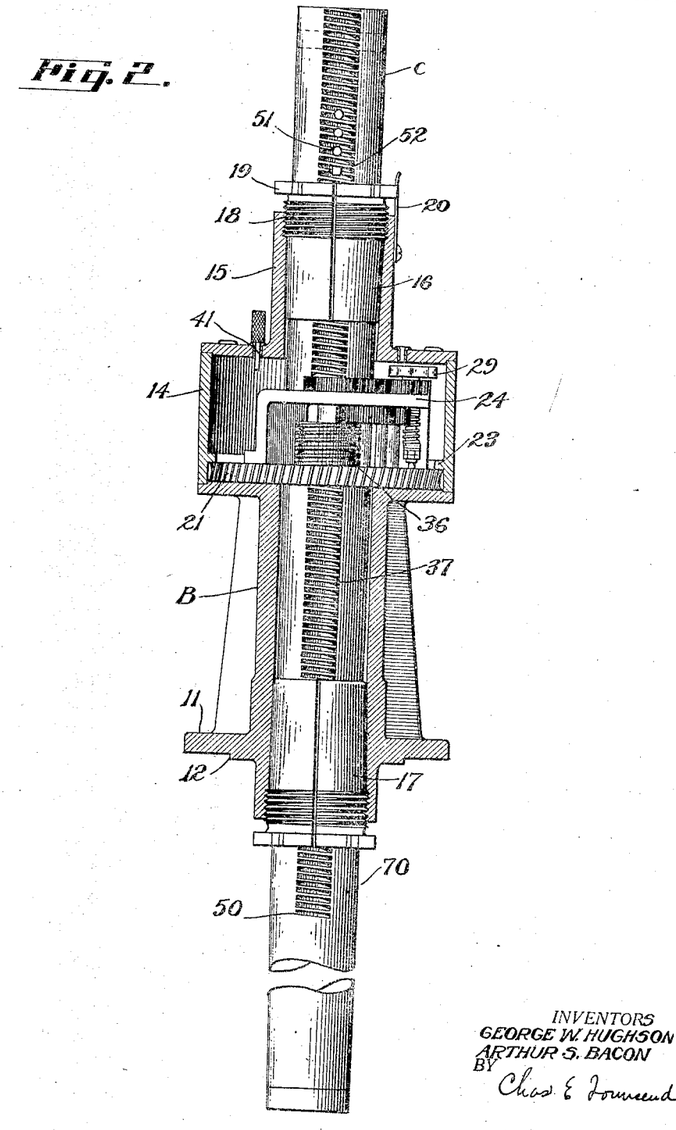
Fig. 2 is a central, vertical, longitudinal section of the housing, which supports the cutting bar and the actuating mechanism.
Figure 3:
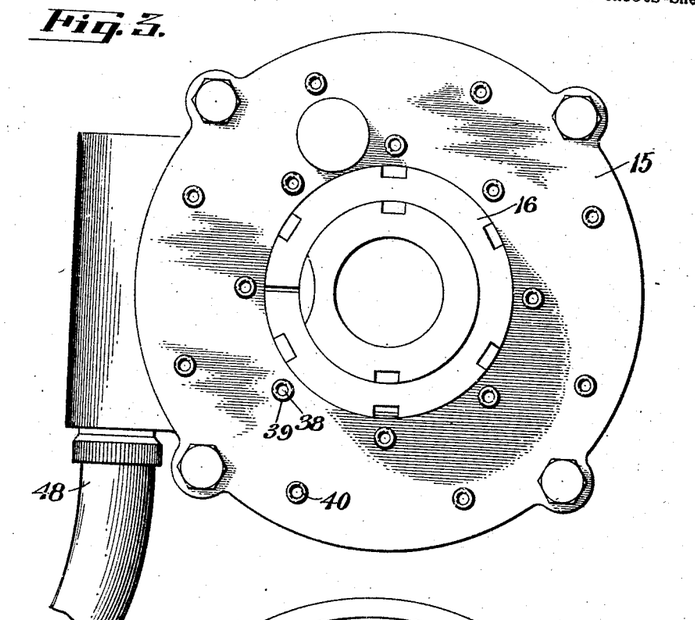
Fig. 3 is an enlarged plan view of the boring machine.

The base member is provided as a support for the boring tool generally illustrated in Figs. 1 and 2. This tool consists of a cylindrical housing member B, on the lower end of which is formed an annular flange 11. This flange is offset as at 12 to permit it to be received by the base member A, and it also permits automatic and instantaneous centering of the housing with relation to the base; any suitable means for securing the housing may be employed or as here shown ordinary cap screws 13.

Formed on the upper end of the housing B is a cylindrical enlarged casing section 14 and forming a cover therefor is an upper housing section 15. Disposed in the upper end of the housing section 15 is a tapering split sleeve bearing 16, and similarly arranged in the lower end of the housing section B is a sleeve 17. The sleeves 16 and 17 are both threaded as at 18, and similarly the ends of the respective housing sections. Both sleeves are also provided with round shaped heads or flanges 19 whereby the sleeve may be turned when adjustment is required, and castellations are preferably formed on both flanges to permit the sleeves or bushings to be locked in their adjusted positions by means of spring arms or latches 20. The respective sleeves or bushings shown form bearings for the cutting bar generally indicated at C. This bar extends through the respective housing sections and the bushings, and means is provided for rotating the bar and also for advancing it axially in either direction, the means employed being housed and entirely inclosed within the enlarged section 14. This mechanism in general consists of a worm gear 21, driven by means of a worm 22. The worm gear 21 is keyed to the cutting bar C, but as this is splined, it is obvious that longitudinal movement of the cutting bar will be permitted while rotary movement is transmitted to the same by means of the gear 21. The gear just referred to is positioned in the lower part of the enlarged housing section 14, and it is secured against vertical movement therein by means of an annular shoulder 23. Formed or otherwise secured on the upper face of the gear 21 is a bracket 24, and journalled in said bracket is a series of shafts indicated at 25, 26, 27 and 28. Secured on the shaft 25, by a pin or other suitable means, is a star gear 29, see Fig. 6, and turnably mounted on the same shaft is a driving pinion 30 which intermeshes with a gear 31 secured on shaft 26. This shaft carries a pinion 32, which meshes with a gear 33 secured on shaft 27. This shaft in turn carries a pinion 34 which meshes with a gear 35 secured on shaft 28. This shaft in turn carries a worm 36, which constantly meshes with a worm rack 37 cut or otherwise formed in one side of the cutting bar C. This rack extends a given distance of the bottom end to the top end of the bar as shown in Figs. 1 and 2, and the worm gear 36 intermeshing therewith is the means employed for imparting axial or longitudinal movement in either direction as will hereinafter be described.

Formed in the cover section of the upper housing 15 is a series of interspaced openings 38, each opening being lined with a bushing 39. Similarly formed is a second set of openings lined with bushings 40. These openings are arranged in a circle concentric with relation to the openings 39, and they are also equally interspaced as shown; there being eight openings in the present instance formed in each circle. Insertible in any one of these openings is a pin 41. This pin when inserted forms a stop member with which one of the teeth of the star wheel engages once during each revolution, and represents the slowest feed or advance imparted to the cutting bar. If it is desired to double the speed of advance, it is only necessary to insert a second pin in the opening directly opposite as such insertion will impart two movements to the star wheel during one revolution of the cutting bar and the gear 22. If it is again desired to further increase the speed, more pins may be inserted as further revolutions or rotary movement will be imparted to the star gear. The turning movement of the star wheel is transmitted to the shaft 25, to which it is secured, and through a friction mechanism to be hereinafter described to the pinion 30. This pinion imparts a rotary movement to the gears 31, 32, 33, 34 and 35, and thereby imparts a rotary movement to the worm pinion 36, which finally advances the bar in one direction or another. Vertical movement is imparted to the bar in a downward direction when one or more pins are inserted in the inner circle of openings indicated at 39, while reverse or upward movement is transmitted to the bar when pins are inserted in the openings 40 disposed in the outer concentric circle, that is it should be remembered that the gear 21 is constantly rotated in one direction by means of the worm pinion 22; further that the several shafts 25, 26, 27 and 28, together with the gears secured thereto, are journalled in the bracket member 24, which in turn is supported or secured to the gear 21. All the gears carried by these shafts therefore rotate about the cutting bar and they are only intermittently rotated whenever engagement is made between a pin 41 and the star wheel. If a pin is placed in the innermost circle of openings 39, engagement is made with the star gear on the inner side thereof, thus rotating it in one direction, while if a pin is placed in the outermost concentric circle of openings indicated at 40, engagement is made with the exterior side of the star wheel and the intermittent rotation thereof is constantly reversed.

Figure 6:
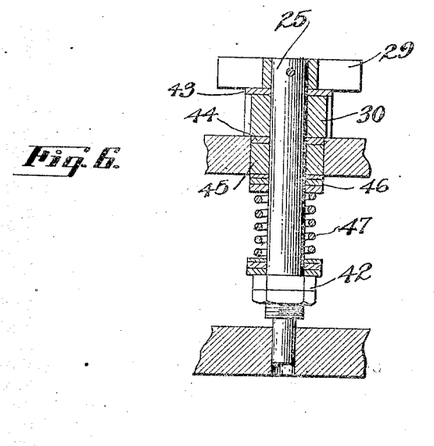
Fig. 6 is an enlarged detail sectional view of the star wheel friction drive employed in connection with the feed mechanism whereby the longitudinal movement is imparted to the cutting bar.

The friction drive disposed upon or carried by the shaft 25 is of considerable importance as it may obviate breakage of the cutting tool, the cylinder or the actuating mechanism if a solid obstruction of any nature is encountered. This friction drive consists of an adjustable nut 42 disposed on the lower end of the shaft 25. Interposed between the star wheel 29 and the driving pinion 30 is a friction washer 43. Disposed on the opposite side of the driving pinion is a friction washer 44, and disposed below the same is a loose bearing bushing 45, on the other side of which is placed a friction washer 46, and interposed between said friction washer and the adjustable nut 42 is a helical spring 47, which may be compressed to any degree desired by the adjustable nut 42. This spring exerts such an upward pressure that the driving pinion 30 is frictionally locked to the star wheel 29, but slippage will take place between the shaft 25 and the driving pinion 30 through which the shaft extends if any solid obstruction is encountered. In other words, the star wheel and shaft would continue to rotate whenever a pin 41 is encountered, but no turning movement would be transmitted through the pinion 30 to the remaining gear train as slippage would take place.

Another important feature of the present invention is the provision of a flexible driving shaft 48. This shaft is attached in any suitable manner to the shaft of the worm 22. The opposite end of the shaft 48 may be connected with an electric motor or other driving unit and as such transmits a turning movement to the worm 22 and without transmitting any shocks or vibrations to the mechanism driven thereby as all such shocks or vibrations are absorbed in the flexible shaft 48. Such a drive is exceedingly important in the present instance as any exterior vibration transmitted through the driving mechanism here shown would have a tendency to give a chattering or ragged cut within the cylinder wall; a feature which should certainly be avoided in a re-boring tool, particularly when it is considered that a re-boring or finishing cut often is so fine that a variation of even one or two thousandths of an inch is detrimental to the final result obtained.

Another important feature of the present invention is the provision of means for positively stopping axial movement of the cutting bar when extreme limits of movement in an upward or downward direction is reached. This is accomplished by terminating the worm rack before the extreme lower end of the bar is reached as shown at 50 in Fig. 2. Such termination of course limits the upward movement of the bar. At the opposite end of the worm rack we drill or tap one or more holes as indicated at 51 and insert a stop screw 52 therein. This screw engages the top thread of the worm pinion 36 when the bar reaches its extreme lower limit and thus secures or locks the same against further rotation. Automatic means for limiting the axial movement of the bar within extreme limits is thus provided and danger of injuring the machine in one way or another is avoided. By providing a plurality of tapped holes as indicated at 51, it is possible to adjust the position of the stop screw and thus slightly increase the axial movement of the bar where further movement might be required.

Another important feature of the present invention is the provision of a cutting bar which is capable of producing a cut from end to end of a cylinder which is positively uniform in diameter. In most boring mills where the cutting tool is secured to the outer end of the bar, and where the cut is of considerable length, it generally happens that the bar springs to such an extent that the diameter of the bore or cut is decreased from two or three thousandths of an inch when the extreme end of the cut is reached. We have found that this decrease in diameter is not so much due to the fact that a cutting bar itself springs, but it is caused more by the thinning out of the oil film in the bearings by which the cutting bar is supported, that is as side pressure increases on the cutting bar, a lever action is produced which tends to squeeze or press the oil film out of the lowermost bearing, for instance that indicated at 17. To take care of the gradual thinning out or lessening in thickness of the oil film in the bearing 17, we taper the bar from end to end. In the present instance the bar has a longitudinal movement or is projected approximately eleven inches when making a cut, that is eleven inches represents approximately the extreme travel of the bar or the distance which the tool holding end of the bar travels downwardly with relation to the bearing 17. This portion of the bar is tapered from the point indicated at 60 or 70 to the extreme lower end; the amount of reduction in diameter being approximately three thousandths of an inch.

In other words, one and one-half thousandths of an inch on each side. In actual operation we will suppose that the end of the bar is projected approximately one inch beyond the end of the bearing 17 when the cut in the cylinder is started. If this is the case, there would be a play of one and one-half thousandths of an inch radially in all directions within the bearing 17 as the bar has been reduced that much in diameter at the lower end. In other words, the bearing would contain an oil film one and one-half one-thousandths of an inch in thickness. This film is easily maintained when the bar is only projected a slight distance as the pressure on the tool is then comparatively small, but as the bar gradually moves in a downward direction side pressure on the bearing increases and the oil film which was originally one and one-half one-thousandths of an inch will naturally have a tendency to squeeze out or become thinner. If the bar had a constant diameter, it is obvious that a certain amount of side play would take place, but as the bar gradually tapers in the present instance, it can be seen that no side play will take place. For instance when the bar begins to reach its extreme limit or projection, the clearance between the bar and the bearing, due to the tapering of the bar, is practically taken up, and as the oil film has gradually reduced in thickness, due to the side pressure exerted during the projection of the bar, it can be seen that no side play will be permitted. In other words, we have discovered that it is not the spring in the bar which causes gradual decrease in the diameter of a cut, but it is the thinning out of the oil film in the bearing which causes the gradual decrease in diameter towards the end of the cut. Such thinning out of the film is permitted in this case, but as the bar gradually increases in diameter to correspond to the thickness of the oil film, it is obvious that no side play will be permitted.

Figure 4:
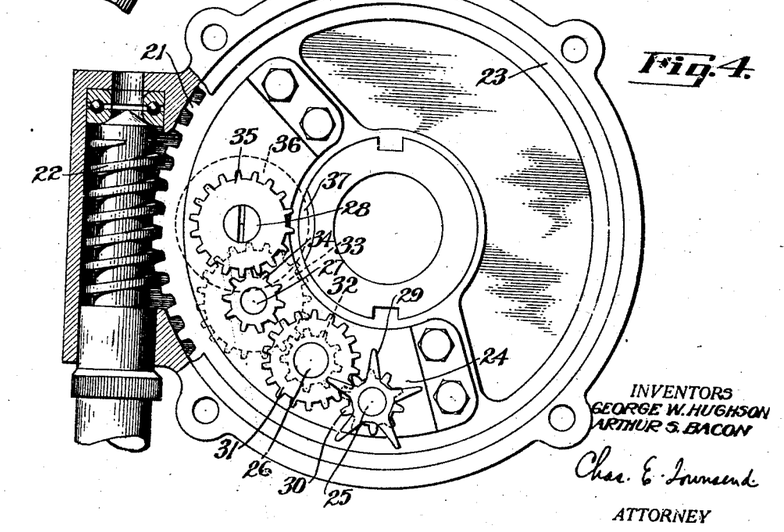
Fig. 4 is an enlarged plan view partially in section showing the feeding mechanism whereby longitudinal movement is imparted to the bar and also the worm drive whereby rotary movement is imparted to the cutting bar.

In actual operation if it is desired to rebore a cylinder, it is only necessary to place the base member A on the top of the cylinder as indicated in Fig. 5, and to center the same by inserting the centering cone 10. The base is then secured by the rods 6 and the screw nuts 8. The centering cone is then removed and the housing proper placed in position on the base; the housing being secured by inserting the cap screws 13. It is of course assumed that the cutting tool indicated at 80 has been applied and that it is in position to start the cut within the cylinder. Power may now be transmitted through the flexible shaft 48 and vibrations from an exterior source are thus eliminated as such vibrations are taken up in the flexible shaft. Rotation of the worm 22, which is directly connected with the flexible drive shaft, causes rotation of the main driving gear 21. This in turn rotates the cutting bar C and the feeding mechanism supported by the gear 21. This mechanism is actuated by one or more pins 41 placed in the inner circle when the bar is to be extended in a downward direction, that is once or more during each revolution the star wheel 29 is engaged by one or more of the pins 41 and a partial revolution is thereby transmitted to the star wheel and the connected gear train generally shown in Fig. 4, which in turn drives the worm 36 which engages the worm rack 37 formed directly on the bar. An axial and a rotary movement is thus transmitted to the bar and the cutting tool is thus advanced through the cylinder. No attention is required during the cutting operation as the bar will be automatically stopped against further axial movement when the cut has been completed, due to the provision of the stop screw 52. When the operator finds that the cut has been completed, he merely removes the pins 41 from the inner circle and inserts the same in the outer circle. In fact every hole in the outer circle may be plugged or a pinion inserted therein during the reverse movement as it is naturally desired to retract the bar as quickly as possible after the first cut has been made. No particular attention is required during the return movement of the bar as it will automatically be stopped when the upper end of its travel is reached, due to the fact that the spiral rack is stopped off as indicated at 50. Upon making the finishing cut, the pins are again shifted to the innermost circle and the bar is again advanced in a downward direction. When this cut has been completed, one or more pins are plugged in the outer circle and the bar is then slowly withdrawn or raised to finally complete the finishing cut.

If during the cutting operation, it is found necessary to stop the cut, for instance if it should be desired to start another cylinder, it is accomplished by releasing the cap screws 13 and removing the housing. If an extra base ring may be had it is obvious that this can be placed on the other cylinder and the base already applied left in place. In that case it is obvious that re-centering of the base member will be unnecessary when the housing is again placed in position. However, if the operator should only be in possession of a single base member, it is obvious that it can be readily re-centered by the centering cone 10.

While certain features of the present invention are more or less specifically illustrated, we wish it understood that various changes in form and proportion may be resorted to within the scope of the appended claims, similarly that the materials and finish of the several parts employed may be such as the experience and judgment of the manufacturer may dictate or varying uses may demand.

Having thus described our invention, what we claim and desire to secure by Letters Patent is—

1. In a tool of the character described, a housing, a boring bar revolvably and longitudinally movable in the housing, a driving member confined within the housing and surrounding the bar and splined to the latter, means for securing said driving member against longitudinal movement in the housing, means carried by said driving member and confined within the housing for feeding the bar longitudinally and means for interchangeably mounting in the housing and for coaction with the feeding means for reversing the direction of operation of the feeding mechanism.

2. In a tool of the character described, a housing, a boring bar revolvably and longitudinally movable in the housing, a driving member splined on the bar, means for securing said driving member against longitudinal movement, and a friction driven feeding mechanism carried by the driving member and rotatable therewith for imparting a longitudinal movement to the bar.

3. In a tool of the character described, a housing, a boring bar rotatably and longitudinally movable in the housing, a driving member splined on the bar, means for securing said driving member against longitudinal movement, and means located within the housing and carried by the driving member including a friction driven means whereby to impart a longitudinal movement to the bar.

4. In a tool of the character described, a housing, a boring bar rotatably and longitudinally movable in the housing, a driving member splined on the bar, means for securing said driving member against longitudinal movement, and means confined within the housing and including friction driven means carried by the driving member for imparting a longitudinal movement to the bar, said friction driven means being reversible, and means projecting into the housing for intermittently actuating said friction driven means either in one direction or the other.

5. In a tool of the character described, a housing, a boring bar revolvably and longitudinally movable in the housing, a driving member on the bar and splined thereto, means securing said driving member against longitudinal movement, a bracket secured on the driving member and rotatable therewith, a star wheel journalled on said bracket, a worm journalled on the bracket, a rack formed on the bar with which said worm intermeshes, means carried by the housing with which the teeth of the star wheel engage during the rotation of the driving member and by which a partial revolution is imparted to the star wheel, and a driving connection formed between the star wheel and the worm.

6. In a tool of the character described, a housing, a boring bar revolvably and longitudinally movable in the housing, a driving member on the bar and splined thereto, means securing said driving member against longitudinal movement, a bracket secured on the driving member and rotatable thereon, a star wheel journalled on said bracket, a worm journalled on the bracket, a rack formed on the bar with which said worm intermeshes, means carried by the housing with which the teeth of the star wheel engage during the rotation of the driving member and by which a partial revolution is imparted to the star wheel, a friction driven member on the star wheel and a driving connection between said friction driven member and the worm.

7. In a tool of the character described, a housing, a boring bar revolvably and longitudinally movable in the housing, a driving member on the bar and splined thereto, means securing the driving member against longitudinal movement, a bracket secured to the driving member and rotatable therewith, a star wheel journalled on said bracket member, a worm journalled on said bracket member, a rack on the cutting bar with which the worm engages, an inner and an outer circle of openings formed in the housing, a pin insertible in any of said openings with which the star wheel engages during the revolution of the driving member, and by which a partial revolution is imparted to the star wheel, said pin when disposed in the innermost circle of openings transmitting movement to the star wheel in one direction, said pin when disposed in one of the openings of the outermost circle, imparting a reverse movement to the star wheel, and means for transmitting movement of the star wheel to the worm.

8. In a tool of the character described a housing, a boring bar revolvably and longitudinally movable in the housing, a driving member on the bar and splined thereto, means securing the driving member against longitudinal movement, a bracket secured to the driving member and rotatable therewith, a star wheel journalled on said bracket member, a worm journalled on said bracket member, a rack on the cutting bar with which the worm engages, an inner and an outer circle of openings formed in the housing, a pin insertible in any of said openings with which the star wheel engages during the revolution of the driving member and by which a partial revolution is imparted to the star wheel, said pin when disposed in the innermost circle of openings transmitting movement to the star wheel in one direction, said pin when disposed in one of the openings of the outermost circle imparting a reverse movement to the star wheel, means for transmitting movement of the star wheel to the worm, and a friction drive in said connection.

9. In a tool of the character described, a housing, a boring bar longitudinally movable in the housing, a driving member confined in the housing, and surrounding the bar and splined to the latter, means within the housing for securing said driving member against longitudinal movement in the housing, a bracket confined within the housing and carried by the driving member and means carried by the driving member and having connection with the bracket and operable for feeding the bar longitudinally in either direction.

10. In a tool of the character described a housing, a boring bar revolvably and longitudinally movable in said housing, means in the housing for rotating the bar, means confined within the housing, and including friction driven means carried by the rotating means for imparting a longitudinal movement thereto, adjustable means at one end of the bar for limiting the longitudinal movement thereof in one direction, and fixed means at the opposite end of the bar for limiting longitudinal movement thereof in the opposite direction.

11. In a tool of the character described a housing, a boring bar revolvably and longitudinally movable in said housing, means confined within the housing for rotating the bar, means carried by the rotating means and confined within the housing for imparting a longitudinal movement thereto, a plurality of tapped holes in one end of the bar, a stop screw insertible therein to limit the longitudinal movement of the bar in one direction, and means on the opposite end of the bar for limiting the movement of the bar in the opposite direction.

12. In a tool of the character described, a housing, a boring bar rotatably and longitudinally movable in the housing, a driving member confined in the housing and surrounding the bar and splined to the latter, means for securing the driving member against longitudinal movement in the housing, a bracket secured at one of its ends to the driving member and confined within the housing, a plurality of shafts between the bracket and the driving member, a driving pinion journalled in the housing and operatively connected to the driving member, a train of gears confined within the housing and connecting the aforesaid shafts, and a star wheel connected to one of said shafts for actuating the train of gears to effect an intermittent operation of the train of gears.

13. In a tool of the character described, a housing, a boring bar rotatably and longitudinally movable in the housing, a driving member surrounding the bar and splined thereto, means for securing said driving member against longitudinal movement in the housing, an arcuate shaped bracket confined within the housing and carried by the driving member and means carried by the driving member and operatively disposed between the same and said bracket and operable for feeding the bar longitudinally in either direction.

14. In a tool of the character described, a housing, a boring bar rotatably and longitudinally movable in the housing, a driving member surrounding the bar and splined thereto, and being confined within the housing, means for securing said driving member against longitudinal movement in the housing, an arcuate shaped bracket confined within the housing and carried by the driving member, means carried by the driving member and disposed between the same and said bracket and operable for feeding the bar longitudinally in either direction, and means for intermittently operating said feeding means.

15. In a cylinder boring tool, a housing, a boring bar mounted in the housing, a gear on the bar and splined thereto and confined within the housing, means for rotating the gear and bar, and means confined within the housing for transmitting a longitudinal movement to the bar during rotation of the bar, including a worm confined within the housing and operatively engaging the bar and a train of gears carried by the first mentioned gear and confined within the housing and operatively connected with said worm.

16. A cylinder boring tool comprising a housing, a boring bar extending through the housing, a gear on the bar and splined thereto, means for imparting a rotary movement to the gear and bar, means for imparting a longitudinal movement to the bar during rotation thereof including a worm arranged in parallelism with the bar and operatively engaging the same, and a train of gears also mounted on the first mentioned gearing and operatively connected to the worm for actuating the latter.

17. A tool of the character described comprising a base, a housing removably attached thereto, a vertically disposed boring bar revolvably and longitudinally movable in said housing, a horizontally disposed gear wheel splined to said bar, means for holding said gear wheel against axial movement, means for rotating said gear wheel, and means carried wholly by said gear wheel over the upper flat face thereof for feeding said bar longitudinally.

18. A tool of the character described comprising a base, a housing removably attached thereto, a vertically disposed boring bar revolvably and longitudinally movable in said housing, a horizontally disposed gear wheel splined to said bar, means for holding said gear wheel against axial movement, means for rotating said gear wheel, means carried wholly by said gear wheel over the upper flat face thereof for feeding said bar longitudinally, and means carried by the wheel adjacent the feed means and actuable for intermittently operating said feed means.

19. A tool of the character described comprising a housing, a vertically disposed boring bar revolvably and longitudinally movable in said housing, a horizontally disposed gear wheel splined to said bar, means to prevent axial movement of said gear wheel, means for rotating said gear wheel, means carried by said gear wheel over the upper flat face thereof for feeding said bar longitudinally, means for intermittently operating said feed means, and means for varying the interval of operation of said intermittent feed operating means.

20. A tool of the character described comprising a base adapted to be clamped upon an engine cylinder, a housing extending from said base, a boring bar revolvably and axially movable in said housing, a wheel splined to said bar, means for holding said wheel against axial movement, a feed mechanism for causing axial movement of said bar, and means movable from place to place on the outside of said housing for regulating the said feed mechanism.

21. A tool of the character described comprising a base adapted to be clamped upon an engine cylinder, a housing extending from said base, a boring bar revolvably and axially movable in said housing, a wheel splined to said bar, means for holding said wheel against axial movement, a feed mechanism confined within said housing and mounted on the upper face of said wheel for causing axial movement of said bar in either direction when said wheel is rotated, means for rotating said wheel and means for varying the operation of said feed mechanism.

22. A tool of the character described comprising a base adapted to be clamped upon an engine cylinder, a housing extending from said base, a boring bar revolvably and axially movable in said housing, a wheel splined to said bar, means for holding said wheel against axial movement, a feed mechanism revolvable with said wheel, and abutments shiftable from one place to another on the outside of said housing and projecting into the housing for regulating the amount of feed of said feed mechanism.

23. A tool of the character described comprising a base adapted to be clamped upon an engine cylinder, a housing extending from said base, a boring bar revolvably and axially movable in said housing, a wheel splined to said bar, means for holding said wheel against axial movement, teeth formed on said bar, a threaded worm revolvably mounted on said wheel and engaging the teeth on said bar, a drive for said worm including a star wheel, and pins extending through said housing for engagement by said star wheel.

24. A tool of the character described comprising a base adapted to be clamped upon an engine cylinder, a housing extending from said base, a boring bar revolvably and axially movable in said housing, a wheel splined to said bar, means for holding said wheel against axial movement, teeth formed on said bar, a threaded worm revolvably mounted on said wheel, a gear train for driving said worm, a star wheel held in frictional engagement with the driving pinion of said gear train, and pins adjustable from the outside of said casing for engagement with said star wheel.

25. In a tool of the character described, a housing, a boring bar rotatably and longitudinally movable in the housing, a driving gear entirely enclosed within the housing and surrounding the bar and splined to the latter, means for securing said driving member against longitudinal movement in the housing, and a gear mechanism confined entirely within the housing and carried wholly by the gear to feed the bar longitudinally in either direction.

ARTHUR S. BACON.
GEORGE W. HUGHSON.